(12) United States Patent
Tripathi et al.

(10) Patent No.: US 12,043,227 B2
(45) Date of Patent: Jul. 23, 2024

(54) MULTI-RECEPTACLE FUEL FILLING AND STORAGE SYSTEM AND METHOD OF USING THE SAME

(71) Applicant: CUMMINS INC., Columbus, IN (US)

(72) Inventors: Sumit Tripathi, Columbus, IN (US); Kevin Labourdette, Auburn, NY (US); Patrick Kaufman, Vacaville, CA (US); Vivek Anand Sujan, Columbus, IN (US); Gregory A. Weber, Greensburg, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/673,656

(22) Filed: Feb. 16, 2022

(65) Prior Publication Data

US 2022/0371556 A1 Nov. 24, 2022

Related U.S. Application Data

(60) Provisional application No. 63/192,335, filed on May 24, 2021.

(51) Int. Cl.
| | |
|---|---|
| *B60S 5/02* | (2006.01) |
| *B60K 15/03* | (2006.01) |
| *B67D 7/04* | (2010.01) |
| *B67D 7/42* | (2010.01) |

(52) U.S. Cl.
CPC .............. *B60S 5/02* (2013.01); *B60K 15/03* (2013.01); *B67D 7/04* (2013.01); *B67D 7/42* (2013.01); *B60K 2015/03131* (2013.01); *B60K 2015/0321* (2013.01); *B60K 2015/03236* (2013.01); *B60K 2015/03243* (2013.01)

(58) Field of Classification Search
CPC ........... B60K 2015/03118; B60K 2015/03131; B60K 2015/03105; B60K 2015/0777
USPC ................................................... 137/255, 264
See application file for complete search history.

(56) References Cited

U.S. PATENT DOCUMENTS

| | | | | |
|---|---|---|---|---|
| 4,765,359 | A * | 8/1988 | Burnett .................... | B67D 7/78 141/237 |
| 5,603,360 | A * | 2/1997 | Teel .......................... | F17C 9/00 137/267 |
| 5,676,180 | A * | 10/1997 | Teel .......................... | F17C 5/06 137/267 |
| 7,325,561 | B2 * | 2/2008 | Mathison ............... | B60K 15/00 141/197 |
| 8,443,820 | B2 * | 5/2013 | Ulrey ..................... | F02D 19/027 141/2 |
| 8,544,494 | B2 * | 10/2013 | Meade ................ | F02M 21/0242 137/255 |
| 8,684,044 | B2 * | 4/2014 | Saiki ......................... | C01B 3/00 141/4 |
| 8,752,596 | B2 * | 6/2014 | Mori ....................... | F17C 3/025 62/53.2 |
| 9,016,329 | B2 * | 4/2015 | Mori ......................... | F17C 5/06 141/2 |

(Continued)

FOREIGN PATENT DOCUMENTS

| | | | | |
|---|---|---|---|---|
| DE | 102020102923 | A1 * | 8/2021 | |
| WO | WO-2021001027 | A1 * | 1/2021 | ........... B60H 1/3232 |

*Primary Examiner* — Timothy L Maust
(74) *Attorney, Agent, or Firm* — Barnes & Thornburg LLP

(57) ABSTRACT

The present disclosure generally relates to a multiple receptacle fuel filling and storage system in a vehicle and/or powertrain, and a method of using the same.

20 Claims, 3 Drawing Sheets

(56) References Cited

U.S. PATENT DOCUMENTS

| | | | |
|---|---|---|---|
| 9,086,040 B2* | 7/2015 | Jentz | G01M 3/02 |
| 9,604,535 B2* | 3/2017 | Yahashi | B60K 15/077 |
| 9,783,043 B2* | 10/2017 | Aso | G01M 3/04 |
| 11,254,202 B2* | 2/2022 | Hoover | F02M 25/089 |
| 2015/0013830 A1* | 1/2015 | Ammouri | F17C 13/026 |
| | | | 141/4 |
| 2015/0184804 A1* | 7/2015 | Handa | F17C 5/06 |
| | | | 141/1 |
| 2016/0123536 A1* | 5/2016 | Grimmer | F17C 5/06 |
| | | | 141/4 |
| 2016/0368374 A1* | 12/2016 | Aso | B60K 15/03 |

* cited by examiner

MULTI-RECEPTACLE FUEL FILLING AND STORAGE SYSTEM AND METHOD OF USING THE SAME

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/192,335 filed on May 24, 2021, the entire disclosure of which is hereby expressly incorporated herein by reference.

TECHNICAL FIELD

The present disclosure relates to a multiple receptacle ("multi-receptacle") fuel filling and storage system and a method of using the same.

BACKGROUND

Vehicle and/or powertrain operators generally prefer to load the maximum quantity of fuel that can be stored in their fuel storage systems. This is especially true prior to a vehicle undertaking a journey. Most operators adopt this behavior because they prefer not to expend time and effort at refueling the vehicle along a route. Further, operators seek to minimize risk associated with uncertainty, such as unanticipated traffic and weather conditions. One way to minimize the exposure to such risks is to maximize the quantity of fuel carried in a vehicle and/or powertrain on a trip, which minimizes the time expended to achieve maximum fuel capacity.

Existing fueling strategies usually fill the powertrain and/or vehicle with a fuel, such as hydrogen, in a single fuel storage module. For example, a hydrogen fuel storage system may be filled with hydrogen fuel at a single point of entry, the fuel filling receptacle. In such embodiments, existing fuel filling methods can deliver up to about 8 kg $H_2$/min. However, there exists a need to be able to deliver more fuel in a given timeframe, such as up to about 40 kg $H_2$/min or more, for some of high-power applications that involve a vehicle and/or powertrain requiring large quantities of fuel.

For these and other reasons, the present specification provides a system and method for increasing the fueling rate by employing multiple fuel filling receptacles ("multi-receptacle"). Such a multi-receptacle fuel filling system and method can increase the fueling rate, maintain minimal temperature of the fuel storage modules during fueling, provide a redundant or back up fueling system in case of emergencies, and be executed at the convenience of an operator.

SUMMARY

Embodiments of the present invention are included to meet these and other needs. In one aspect, described herein is a multi-receptacle fuel filling and storage system in a vehicle and/or powertrain. The multi-receptacle fuel filling and storage system includes one or more receptacles for simultaneously attaching to one or more fuel-filling nozzles, more than one fuel storage module comprising the one or more receptacles, and one or more tanks for simultaneously receiving and storage of fuel. In one embodiment, each of the one or more tanks in the more than one fuel storage modules are separated by pressure equalizing walls.

In one aspect, described herein is a method for fueling a multi-receptacle fuel filling and storage system in a vehicle and/or powertrain. The method includes attaching more than one nozzles to more than one receptacles in more than one fuel storage modules comprising one or more tanks, and fueling the multi-receptacle fuel filling and storage system through the more than one receptacles. In one embodiment, the method includes using a receptacle manifold for attaching the more than one nozzles to the more than one receptacles in the more than one fuel storage modules.

In one embodiment, the method of fueling the multi-receptacle fuel filling and storage system is managed by a controller. In some embodiments, the controller manages the fueling of the one or more fuel storage modules based on temperature, pressure rating, and fuel storage volume in the one or more tanks.

BRIEF DESCRIPTION OF THE DRAWINGS

These and other features, aspects, and advantages of the present invention will become better understood when the following detailed description is read with reference to the accompanying drawings.

Figure 1:
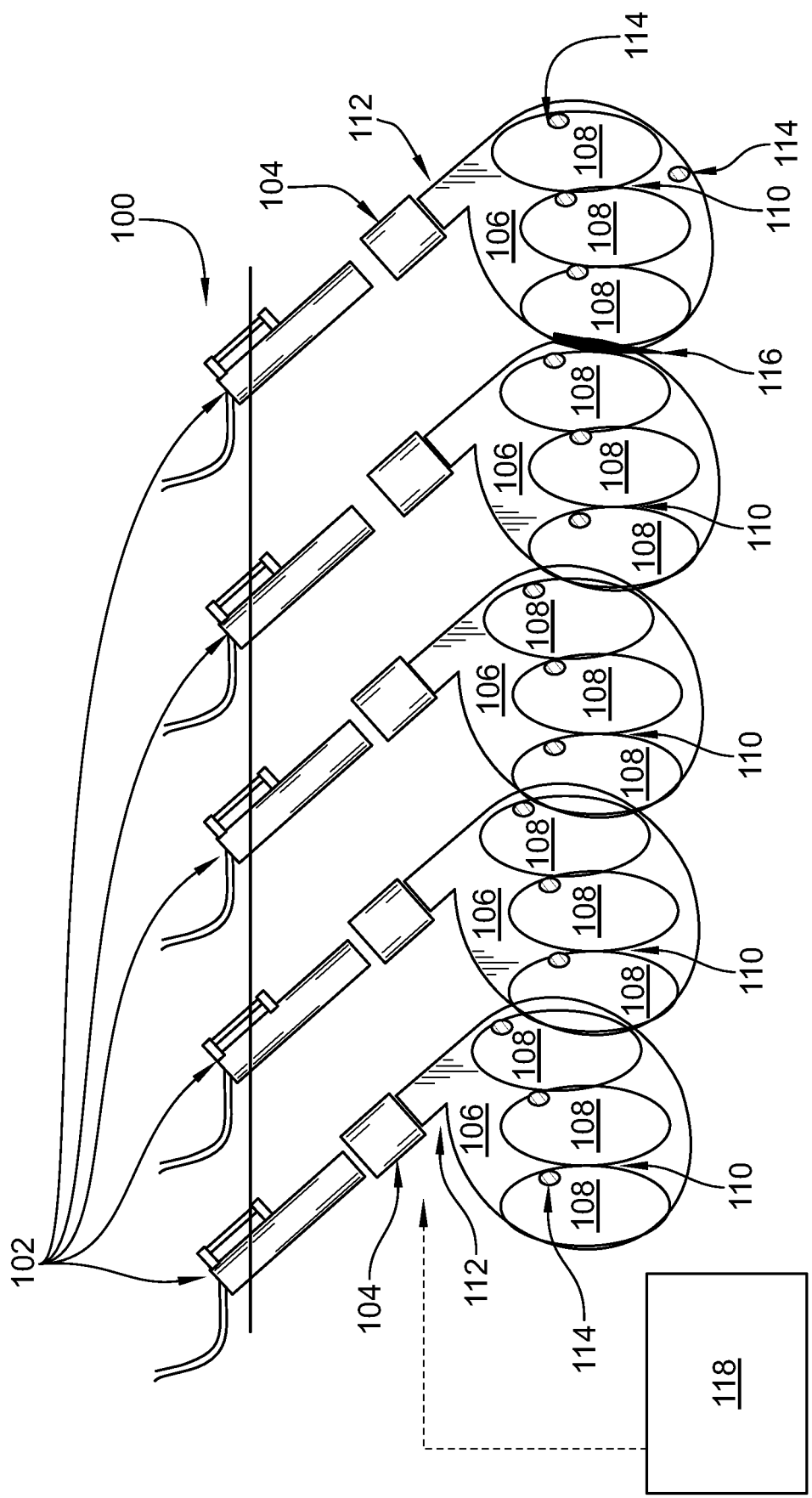
FIG. 1 is an illustration of multiple nozzles being used to fuel multiple receptacles in a mufti-receptacle fuel storage system.

In the following detailed description, reference is made to the accompanying drawings that form a part hereof and in which is shown by way of illustration specific illustrative embodiments in which the invention may be practiced. The following detailed description is not to be taken in a limiting sense.

DETAILED DESCRIPTION

The present disclosure is directed to a multiple receptacle ("multi-receptacle") fuel filling and storage system and methods for using the same. The present multi-receptacle fuel filling and storage system may increase the efficiency of fueling or storing fuel in a vehicle and/or powertrain. Methods of using the present multi-receptacle fuel filling and storage system may also increase the efficiency of fueling or storing fuel in a vehicle and/or powertrain.

In one embodiment, a vehicle and/or powertrain may comprise a fuel filling and/or storage system. In other embodiments, the fuel filling, and/or storage system is a multi-receptacle fuel filling and storage system of the present invention. In some embodiments, the multi-receptacle fuel filling and/or storage system includes a fuel.

The fuel of the present disclosure may be any fuel known in the art to power a vehicle or a powertrain. In some embodiments, the fuel is hydrogen ($H_2$). In other embodiments, the fuel is a different fuel, such as a hydrocarbon fuel, natural gas, gasoline, etc. The fuel may be filled, stored, and/or dispensed by the multi-receptacle fuel filling and storage system of the vehicle and/or powertrain. For example, in an exemplary embodiment, the fuel may be filled, stored, and/or dispensed by the multi-receptacle fuel filling and storage system in a fuel filling station (e.g., a gas or fueling station).

In one embodiment, the multi-receptacle fuel filling and storage system includes one fuel storage module. The fuel storage module stores or holds fuel. In another embodiment, the multi-receptacle fuel filling and storage system may have two, three, four, five, or more fuel storage modules. Each fuel storage module in the multi-receptacle fuel filling and storage system has one or more tanks or cylinders.

In one embodiment, each fuel storage module in the multi-receptacle fuel filling and storage system has one fuel filling receptacle. In some embodiments, each storage module in the multi-receptacle fuel filling and storage system may have more than one fuel filling receptacle.

Each fuel filling receptacle may also connect to a separate nozzle. For example, in a fuel filling station, one or more nozzles may be attached to a fuel filling pump. The nozzle of the fuel filling pump may contact, connect, and/or lock with the fuel filling receptacle. Once connected, the nozzle is enabled to dispense fuel from the fuel filling pump through the nozzle and into the fuel filling receptacle comprised by the storage module of the vehicle and/or powertrain.

Fuel (e.g., a hydrogen-based fuel) can be delivered to the multi-receptacle fuel filling and storage system at a rate that is faster than the rate of filling a fuel storage system that has one fuel storage module with a single fuel filling receptacle. In some embodiments, the rate of filling a vehicle and/or powertrain with a multi-receptacle fuel filling and storage system is a multiple of the single receptacle fueling rate of the fuel filling station used to fill fuel in the vehicle and/or powertrain. For example, a set of five storage modules with five independent receptacles, each with a filling rate of 8 kg/min may yield a fuel filing rate as follows Number of receptacles(1)per storage modules(5)×
Single fuel receptacle filling rate(8 kg/min)=40 kg/min To deliver fuel to the fuel storage system, a nozzle is connected to each fuel filling receptacle. One or more fueling nozzles may be connected (e.g., simultaneously) to each of the one or more fuel filling receptacles to deliver fuel to a multi-receptacle fuel filling and storage system that has one or more storage modules with each storage module having one or more fuel filling receptacles. In some embodiments, the one or more nozzles may be sequentially connected to the one or more fuel filling receptacles of the multi-receptacle fuel filling and storage system.

In another embodiment, the one or more nozzles may be simultaneously connected to the one or more fuel filling receptacles of the multi-receptacle fuel filling and storage system. In a further embodiment, a receptacle manifold may comprise a quick connect mechanism. The quick connect mechanism may comprise a male portion and a female portion of a plug-in socket. In one embodiment, the male portion of the socket contacts and engages with the female portion of the socket in order to ensure efficient, safe, and minimum leakage occurs during fuel filling.

The quick connect mechanism may also be configured to simultaneously connect the one or more nozzles to the one or more fuel filling receptacles of a multi-receptacle fuel filling and storage system. For example, in one embodiment, the receptacle manifold may be configured to be connected or attached to one or more nozzles, such as those nozzles located on a fuel filling pump. In another embodiment, the nozzle may comprise one or more levers that match or complement the receptacle of a vehicle.

In one embodiment, the receptacle manifold may include a multi-lever sliding arm mechanism to deliver fuel to the multi-receptacle fuel filling and storage system. In one embodiment, the multi-lever sliding arm mechanism or device may simultaneously connect or attach to the one or more fuel filling receptacles to enable fueling or fuel filling of the multi-receptacle fuel filling and storage system on the vehicle or powertrain. In another embodiment, the receptacle manifold may use the multi-lever sliding arm mechanism or device to simultaneously detach the one or more nozzles from the one or more fuel filling receptacles to discontinue dispensing fuel to the multi-receptacle fuel filling and storage system. In other embodiments, the receptacle manifold may use a different mechanism to attach and/or detach (e.g., simultaneously attach and simultaneously detach) the one or more nozzles to the one or more fuel filling receptacles to deliver or discontinue delivery of fuel to the multi-receptacle fuel filling and storage system.

Typically, using a manifold to attach and/or detach the one or more nozzles to the one or more fuel filling receptacles will reduce or decrease the time involved in fueling the vehicle and/or powertrain. Particularly when compared to the time involved in attaching the one or more nozzles to the one or more fuel filling receptacles and fueling the vehicle or powertrain without using a manifold, the fuel filling and storage system of the present disclosure will significantly reduce or decrease the time required for fueling of a storage module, vehicle, or powertrain.

In one embodiment, the fuel storage modules in a multi-receptacle fuel filling and storage system are pressurized to a rated pressure point. In some embodiments, the fuel storage modules may be pressurized to a pressure ranging from about 150 bar to about 1000 bar, including any specific pressure comprised therein. For example, in some embodiments the fuel storage modules may comprise hydrogen fuel and/or be pressurized at a pressure ranging from about 350 bar to about 900 bar, including any specific pressure comprised therein. In other embodiments, the fuel storage modules may comprise hydrogen fuel and/or be pressurized at a pressure at or about 500, 550, 600, 650, 700, 750 or 800 bar.

In other embodiments, the fuel storage modules may comprise natural gas and/or be pressurized to a pressure ranging from about 150 bar to about 500 bar, including any specific pressure comprised therein. In other embodiments, the fuel storage modules may comprise natural gas and/or be pressurized at a pressure of at or about 150, 200, 250, 300, or 350 bar.

Also, in some embodiment, the fuel may comprise cryo-liquid fuel, which is not pressurized. Therefore, in some embodiments, the fuel storage modules may comprise cryo-liquid fuel and/or be pressurized to a pressure ranging from about 0 bar to about 50 bar, including any specific pressure comprised therein. In other embodiments, the fuel storage modules may comprise cryo-liquid fuel and/or be pressurized at a pressure of at or about 0, 5, 10, 15, 20, 25, 30, 35, 40, 45, or 50 bar.

A fuel storage module in the multi-receptacle fuel filling and storage system may be filled with fuel (e.g., hydrogen) until the rated pressure point of that fuel storage module is reached or at maximum capacity. However, the process of filling fuel in a fuel storage module may increase the temperature of the fuel inside the fuel storage module. This increased temperature may result in a partially filled fuel storage module.

This partial fuel filling phenomenon is due to the contraction of fuel (e.g., $H_2$ gas) as the temperature of fuel decreases to a range of about 85° C. to about 25° C., including any specific temperature comprised therein. In one or more embodiments, the maximum temperature of fuel in the fuel storage module ranges from about 25° C. to about 1000° C., including any specific temperature comprised therein, and/or at or about 85° C.

In ambient or freezing conditions, the temperature of fuel may decrease to a range of about 25° C. to about −40° C., including any specific temperature comprised therein. As the temperature warms back up to ambient after filling, the fuel expands again. This issue of partial filling due to changes in temperature in a fuel storage module during and after filling fuel may be offset or overcome by over pressurizing the fuel storage modules.

In one embodiment of the present fuel filling and storage system, the fuel storage module may be over pressurized to a specific pressure. For example, in some embodiment, the fuel storage module may be over pressurized to about 125% of the rated pressure. In one embodiment, the fuel storage module having a 3000 psi tank can typically be filled to about 3750 psi. In other embodiments, the fuel storage module may be pressurized to be compliant and in accordance with safety limits, regulations, and/or restrictions, such as those imposed by the National Highway Traffic Safety Administration or other local, regional, or federal safety agencies.

In some embodiments, the temperature of the one or more fuel storage modules may be reduced by use of an internal flow path. For example, the fuel storage module may comprise an internal flow path for the fuel to flow to reduce temperature of the storage module by about 5° C. In addition, the internal flow path may also have a fuel filter in order to streamline and/or filter the fuel flow before it enters the storage module. The fuel filter helps to streamline the fuel flow. The geometry of the fuel filter also attributes to the efficiency and effectiveness by which the fuel filter is able to streamline the fuel flow.

A streamlined fuel flow results in better gas efficiency, prevention, performance, and/or maintenance of temperature rise during filling.

Comparatively, the streamlined fuel flow of the present fuel cell module and/or system provides specific advantages as compared to when the fuel flow in the fuel storage module is not streamlined, and allowed to be turbulent. Fuel turbulence is reduced or prevented by the fuel filter of the present fuel cell module, which enables fuel to flow smoothly such that bends and turns in piping or tubing (e.g., a 90° C. turn) do not cause the fuel to flow unevenly. The streamlining of the fuel filter also aids in the reduction or prevention of an increase in fuel temperature during flow.

As previously described, the fuel storage modules of the present fuel filling and storage system may each have one or more tanks or cylinders. The fuel storage modules may communicate with each other, the tanks, and/or with the fuel filling station through a controller. For example, a controller of the present fuel filling and storage system may manage and optimize the temperature and/or pressure inside each tank. Communication between fuel storage modules, tanks, fuel receptacles, nozzles, and/or fuel filling stations with the controller can be used to detect, analyze, compare, and/or alter the temperature and pressure conditions in the fuel storage modules In an illustrative embodiment, detection and/or communication between any and/or all of the components of the fuel filling and storage system may occur using one or more sensors. A sensor of the present system may be a temperature or a pressure sensor. Another embodiment of a sensor may be a current, power, or a voltage sensor.

In one embodiment, the one or more tanks in a fuel storage module may have a wall that equalizes the pressure between the tanks (e.g., pressure equalizing wall). This pressure equalizing wall may allow for flow of fuel between the one or more tanks in a fuel storage module. For example, fuel may flow between one or more tanks based on temperature and pressure variances in the one or more tanks of the fuel storage modules. The temperature and pressure variances in the one or more tanks in a fuel storage module may be determined and/or detected by temperature sensor or pressure sensors and communicated to the controller and/or other components of the fuel filling and storage system.

The present disclosure is also directed to a method for using the multi-receptacle fuel filling and storage system in a vehicle and/or powertrain. For example, the present method may comprise connecting and/or attaching one or more nozzles to one or more fuel receptacles of a vehicle or powertrain. The present method further includes releasing one or more nozzles from a fuel filling station.

The method for using and/or controlling safe and efficient fueling of the multi-receptacle fuel filling and storage system in a vehicle and/or powertrain may be used for various fuel types. In illustrative embodiment, the present method and system may be used with fuel, including but not limited to gaseous compressed hydrogen, liquid hydrogen, cryogenic compressed hydrogen, gaseous compressed natural gas, and liquid natural gas. Any other power generation fuel may also be used with the present system and method.

Releasing the nozzles may comprise accessing the one or more nozzles of a receptacle manifold, for example simultaneously accessing, the one or more nozzles of a receptacle manifold. The present method further comprises inserting the one or more nozzles (e.g., simultaneously inserting) into the one or more fuel filling receptacles and dispensing fuel from the one or more nozzles (e.g., simultaneously dispensing) into the one or more fuel storage modules. In another embodiment, the present method includes inserting the one or more nozzles (e.g., simultaneously inserting) into the one or more fuel cell receptacles and dispensing fuel from the one or more nozzles (e.g., simultaneously dispensing) into the one or more tanks of the one or more fuel storage modules.

The present method further comprises filling the fuel to any capacity, particularly maximum capacity. The method also includes storing the fuel in the one or more tanks of the one or more fuel storage modules of the vehicle and/or powertrain on a trip or a route. The method also comprises reducing or preventing refueling the vehicle and/or powertrain on a trip or a route, wherein the average distance of a trip or a route ranges from about 300 miles to about 800 miles, including any mileage comprised therein. The method also includes preventing or reducing an operator from refueling the vehicle and/or powertrain on a trip or a route.

The present method may also include feedback communication conducted with one or more feedback devices (e.g., a sensor and/or controller). Feedback communication of the present fuel filling and storage system and method initiates or stops the process of fueling. Fueling may be started, stopped, altered, monitored, and/or regulated based on many factors determined and/or detected in the system or method. For example, fueling may be ceased by the feedback loop of the present system or method when the fuel storage volume of the one or more tanks and/or the one or more fuel storage modules reaches, approaches, and/or nears maximum capacity.

The present method may further include a recalibration device or mechanism (e.g., a sensor and/or a balancing means). The recalibration device and/or mechanism detects imbalance in the fuel storage of the one or more tanks of a fuel storage module. In one embodiment, the recalibration device acts based on a fuel storage volume detected of the one or more tanks and/or the one or more fuel storage modules.

Typically, any rise in the minimum and/or maximum pressure or temperature of a given tank is representative of fuel in the storage module comprising that particular tank. Detection of fuel in the one or more tanks or storage module may initiate recalibration of the fuel in order to make more balanced. In one embodiment, recalibration may require that fuel is moved from one tank to another tank within a fuel storage module.

In one embodiment, this recalibration mechanism is automatic, electronic, and/or performed in real time. In other embodiments, recalibration may not be performed in real time and may need input from an operator or a user. In some embodiments of the present method, an operator or user is a human.

In one embodiment, the multi-receptacle fuel filling and storage system 100 has one or more fuel storage modules 106. In an illustrative embodiment, as shown in FIG. 1, the multi-receptacle fuel filling and storage system 100 may have about one, about two, about three, about four, less than five, about five, or more than five, such as about six, or six or more fuel storage modules 106. In one embodiment, the multi-receptacle fuel filling and storage system 100 will have the same number of nozzles, receptacles, and storage modules. For example, in one embodiment, the ratio of nozzles:receptacles:storage modules is about 1:1:1.

Each fuel storage module 106 includes at least one fuel filling receptacle 104. In one embodiment, each fuel filling receptacle 104 can attach or connect to one nozzle 102. In an embodiment, each fuel filling receptacle 104 can only attach or connect to one nozzle 102. In another embodiment, each fuel filling receptacle 104 can attach or connect to more than one nozzle 102 with no limit.

In addition, each fuel storage module 106 may include one or more tanks or cylinders 108. In an illustrative embodiment, a fuel storage module 106 includes at least one tank 108 and may comprise any number of tanks 108. In an illustrative embodiment, the fuel storage module 106 may comprise about one to about a dozen tanks or cylinders 108. In an exemplary embodiment, the fuel storage module 106 may comprise about 1 to about 15 tanks, from about 1 to about 12 tanks, from about 1 to about 10 tanks, from about 1 to about 9, from about 1 to about 8, from about 1 to about 7, from about 1 to about 6, from about 1 to about 5 tanks, from about 1 to about 4 tanks, from about 1 to about 3 tanks, and from about 1 to about 2 tanks 108. Each tank 108 and/or fuel storage module 106 may comprise one or more sensors 114.

FIG. 1 shows an embodiment of the present fuel filling and storage system 100 comprising about five nozzles 102, about five receptacles 104, about five storage modules 106, each comprising about three tanks 108, about three or more sensors 114, and about one internal flow path 112 in each of its storage modules. Accordingly, the illustrative embodiment of the present fuel filling and storage system 100 shown in FIG. 1 has about five nozzles 102, about five receptacles 104, about five storage modules 106, about fifteen tanks 108, about fifteen or more sensors 114, and about one or more internal flow path 112. Each storage module 106 may further comprise one or more pressure equalizing walls 110 configured to be connected to and to separate each of two tanks 108.

In one embodiment, a vehicle and/or powertrain may have an unlimited number of the present fuel filling and storage systems 100. In one embodiment, the fuel filling and storage system 100 may be on the left side. In other embodiments, a vehicle and/or powertrain 200 may have the present fuel filling and storage system 100 on the right side.

In a further embodiment, a vehicle and/or powertrain 200 may have the present fuel filling and storage system 100 on both the left and the right sides. In an illustrative embodiment, as shown in FIG. 2, a vehicle and/or powertrain 200 may have one fuel filling and storage system 100 on the left side 206 and an additional fuel filing and storage system on the right side 208.

Figure 2:
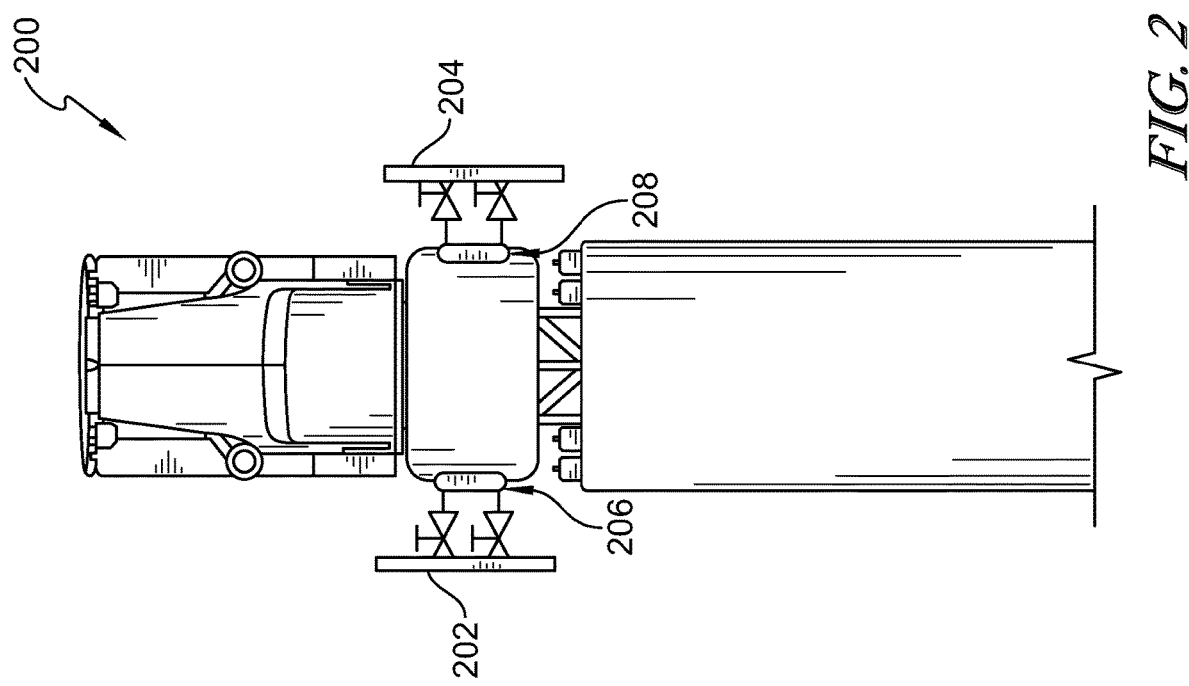
FIG. 2 is a schematic that shows the use of a manifold to fuel multiple receptacles on two sides of a vehicle.

While any number of fueling receptacle manifolds 202, 204 may be present on a fuel filling station (not shown), FIG. 2 shows a first receptacle manifold 202 and a second receptacle fueling manifold 204. For example, the first fueling receptacle manifold 202 may be in any position to fuel the fuel filling and storage system 100 on the left side 206 of the vehicle and/or powertrain 200. The second receptacle manifold 204 may be in any position to fuel the fuel filling and storage system 100 on the right side 208 of the vehicle and/or powertrain 200. In exemplary embodiments, the first receptacle manifold 202 and the second receptacle manifold 204 may be used simultaneously. In other embodiments, the first receptacle manifold 202 and the second receptacle manifold 204 may be used sequentially, consecutively, concurrently, automatically, and/or manually, such as by an operator or a user. Each receptacle manifold 202, 204 may fuel all or a subset or portion of the fuel storage modules 106 on the left 206 and right side 208 of the vehicle and/or powertrain 200, respectively.

Figure 3:
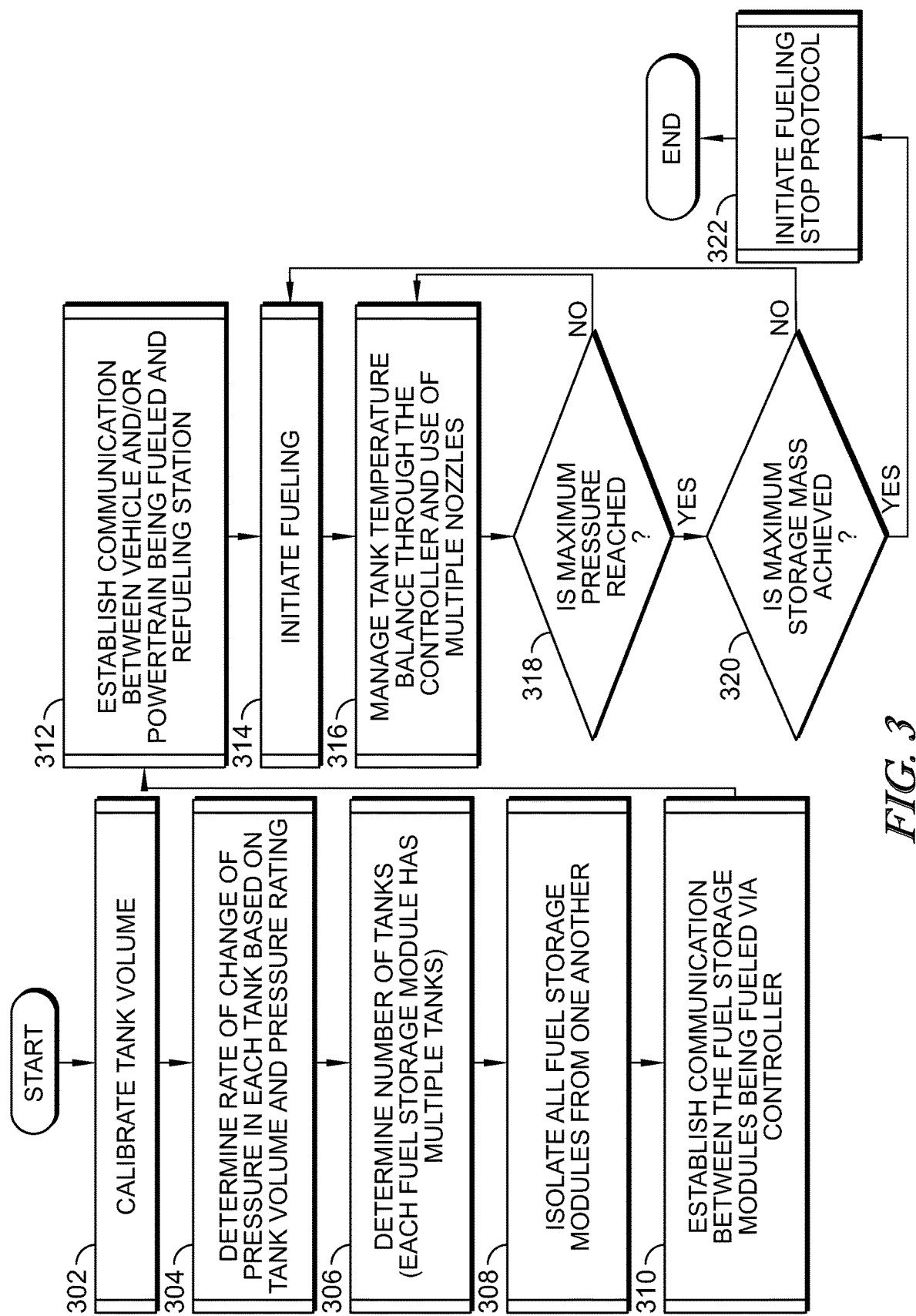
FIG. 3 is a flowchart that shows a control strategy and/or method for using a multi-receptacle fuel storage system.

FIG. 3 illustrates various steps executed in one embodiment of the present method for using the multi-receptacle fuel filling and storage system 100 in a vehicle and/or powertrain. In step 302, a fuel storage volume of the one or more tanks 108 in each fuel storage module 106 is determined and/or detected, such as by a sensor 114. In step 304, the rate of change of pressure for the one or more tanks 108 is determined based on the fuel storage volume of each tank 108 and the pressure rating associated with a given fuel storage volume. This pressure rating may be established based on safety limits.

In step 306, the total number of tanks 108 in all the fuel storage modules 106 in the multi-receptacle fuel filling and storage system 100 is determined and/or detected (e.g., with a sensor). Each fuel storage module 106 may have a different number of tanks 108. In some embodiments, the fuel storage modules 106 may be in connection or communication with each other (see FIG. 1). In other embodiments, such as that shown in step 308 of FIG. 3, all fuel storage modules 106 are isolated from each other and are not in contact or communication with each other.

In such embodiments where the fuel storage modules 106 are not in connection or communication, a separation device 116 may be utilized. In one embodiment, an isolation or a separation device 116 may comprise an isolation solenoid valve. In some embodiments, the fuel storage modules 106 may be isolated from each other with other isolation devices, such as fuel supply and refill solenoid valves with or without electronic controls.

Referring back to FIG. 3, step 310 depicts communication between the fuel storage modules 106 is established via a controller 118. The controller 118 manages the fueling of a multi-receptacle fuel filling and storage system 100. In one embodiment, the controller 118 may be on the vehicle and/or powertrain 200 being refueled. In other embodiments, the controller 118 may be outside the vehicle and/or powertrain being refueled.

Referring to the dashed lines indicated in FIG. 3, communication between the fuel storage modules 106 and the controller 118 may be through wired, wireless and/or power line connections and associated protocols (e.g., a standard controller area network (CAN), J1939 industry standard protocol, Ethernet, InfiniBand®, Bluetooth®, Wi-Fi®, WiMAX, etc.). In step 312 of FIG. 3, communication between the vehicle and/or powertrain 200 being fueled and a fuel filling station fueling the vehicle or powertrain is established. Communication between the vehicle and/or powertrain 200 being fueled and the fuel filling station may be through wired, wireless and/or power line connections and associated protocols (e.g., Ethernet, InfiniBand®, Bluetooth®, Wi-Fi®, WiMAX, 3G, 4G LTE, 5G, etc.).

In step 314 of FIG. 3, fueling the vehicle and/or powertrain 200 is initiated. Fueling is executed through one or more nozzles 102 that can be connected to the one or more receptacles 104 in the one or more fuel storage modules 106 being filled. In step 316, the temperature in each of the tanks 108 is managed by the controller 118 and by balancing to recalibrating use of the multiple nozzles 102 being used to fuel the multiple fuel storage modules 106.

In step 318 of FIG. 3, the controller 118 determines if a maximum pressure has been reached in each of the one or more tanks 108. If maximum pressure is not reached, step 316 is repeated. If maximum pressure is reached, the controller 118 determines if maximum storage mass is achieved in step 320. If maximum storage mass is not achieved, step 314 is repeated. If maximum storage mass is achieved, step 322 is executed, and the protocol to stop fueling is initiated.

The following numbered embodiments are contemplated and non-limiting:

1. A multi-receptacle fuel filling and storage system in a vehicle and/or powertrain comprising i) one or more fuel filling receptacles for simultaneously attaching to one or more fuel filling nozzles, ii) one or more fuel storage module comprising the one or more fuel filling receptacles, and iii) one or more tanks for simultaneously receiving and storage of fuel.

2. The multi-receptacle fuel filling and storage system of clause 1, any other suitable clause, or any combination of suitable clauses, wherein the multi-receptacle fuel filling and storage system includes a fuel.

3. The multi-receptacle fuel filling and storage system of clause 2, any other suitable clause, or any combination of suitable clauses, wherein the fuel is hydrogen, hydrocarbon fuel, natural gas, gasoline, cryo-liquid fuel, gaseous compressed hydrogen, liquid hydrogen, cryogenic compressed hydrogen, gaseous compressed natural gas, liquid natural gas, or any fuel known to power a vehicle or a powertrain.

4. The multi-receptacle fuel filling and storage system of clause 2, any other suitable clause, or any combination of suitable clauses, wherein the fuel is filled, stored, and/or dispensed by the multi-receptacle fuel filling and storage system of the vehicle and/or powertrain, or is filled, stored, and/or dispensed by the multi-receptacle fuel filling and storage system of the vehicle and/or powertrain in a fuel filling station.

5. The multi-receptacle fuel filling and storage system of clause 4, any other suitable clause, or any combination of suitable clauses, wherein the fuel filling station is a gas station or a fueling station.

6. The multi-receptacle fuel filling and storage system of clause 4, any other suitable clause, or any combination of suitable clauses, wherein the fuel filling station includes a receptacle manifold.

7. The multi-receptacle fuel filling and storage system of clause 6, any other suitable clause, or any combination of suitable clauses, wherein the receptacle manifold includes a first receptacle manifold and a second receptacle manifold.

8. The multi-receptacle fuel filling and storage system of clause 7, any other suitable clause, or any combination of suitable clauses, wherein the first receptacle manifold is in any position to fuel the multi-receptacle fuel filling and storage system on a left side of the vehicle and/or powertrain.

9. The multi-receptacle fuel filling and storage system of clause 7, any other suitable clause, or any combination of suitable clauses, wherein the second receptacle manifold is in any position to fuel the multi-receptacle fuel filling and storage system on a right side of the vehicle and/or powertrain.

10. The multi-receptacle fuel filling and storage system of clause 7, any other suitable clause, or any combination of suitable clauses, wherein the first receptacle manifold and the second receptacle manifold are used simultaneously, sequentially, consecutively, concurrently, automatically, and/or manually by an operator or a user.

11. The multi-receptacle fuel filling and storage system of clause 7, any other suitable clause, or any combination of suitable clauses, wherein the first receptacle manifold fuels all or a subset or a portion of the one or more fuel storage modules the left side of the vehicle and/or powertrain.

12. The multi-receptacle fuel filling and storage system of clause 7, any other suitable clause, or any combination of suitable clauses, wherein the second receptacle manifold fuels all or a subset or a portion of the one or more fuel storage modules the right side of the vehicle and/or powertrain.

13. The multi-receptacle fuel filling and storage system of clause 6, any other suitable clause, or any combination of suitable clauses, wherein the receptacle manifold fuels all or a subset or a portion of the one or more storage modules.

14. The multi-receptacle fuel filling and storage system of clause 6, any other suitable clause, or any combination of suitable clauses, wherein the receptacle manifold comprises a quick connect mechanism.

15. The multi-receptacle fuel filling and storage system of clause 14, any other suitable clause, or any combination of suitable clauses, wherein the quick connect mechanism comprises a male portion and a female portion of a plug-in socket.

16. The multi-receptacle fuel filling and storage system of clause 15, any other suitable clause, or any combination of suitable clauses, wherein the male portion of the socket contacts and engages with the female portion of the socket.

17. The multi-receptacle fuel filling and storage system of clause 14, any other suitable clause, or any combination of suitable clauses, wherein the quick connect mechanism is configured to simultaneously connect the one or more fuel filling nozzles to the one or more fuel filling receptacles.

18. The multi-receptacle fuel filling and storage system of clause 6, any other suitable clause, or any combination of suitable clauses, wherein the receptacle manifold includes a multi-lever sliding arm mechanism or device.

19. The multi-receptacle fuel filling and storage system of clause 18, any other suitable clause, or any combination of suitable clauses, wherein the multi-level sliding arm mechanism or device simultaneously connects or attaches to the one or more fuel filling receptacles.

20. The multi-receptacle fuel filling and storage system of clause 6, any other suitable clause, or any combination of suitable clauses, wherein the receptacle manifold uses the multi-lever sliding arm mechanism or device to simultaneously detach the one or more fuel filling nozzles from the one or more fuel filling receptacles to discontinue dispensing fuel to the multi-receptacle fuel filling and storage system.

21. The multi-receptacle fuel filling and storage system of clause 6, any other suitable clause, or any combination of suitable clauses, wherein the receptacle manifold uses a mechanism or device to attach and/or detach the one or more nozzles to the one or more fuel filling receptacles to deliver or discontinue delivery of fuel to the multi-receptacle fuel filling and storage system.

22. The multi-receptacle fuel filling and storage system of clause 2, any other suitable clause, or any combination of suitable clauses, wherein the fuel can be delivered to the multi-receptacle fuel filling and storage system at a rate that is faster than a rate of filling a fuel storage system that has one fuel storage module with a single fuel filling receptacle.

23. The multi-receptacle fuel filling and storage system of clause 22, any other suitable clause, or any combination of suitable clauses, wherein the rate of filling the vehicle and/or powertrain with the multi-receptacle fuel filling and storage system is a multiple of the rate of filling the fuel storage system that has one fuel storage module with the single fuel filling receptacle.

24. The multi-receptacle fuel filling and storage system of clause 1, any other suitable clause, or any combination of suitable clauses, wherein the multi-receptacle fuel filling and storage system is filled with fuel until a rated pressure point of the fuel storage module is reached or at maximum capacity.

25. The multi-receptacle fuel filling and storage system of clause 1, any other suitable clause, or any combination of suitable clauses, wherein the multi-receptacle fuel filling and storage system includes a controller.

26. The multi-receptacle fuel filling and storage system of clause 25, any other suitable clause, or any combination of suitable clauses, wherein the controller manages the fueling of the one or more fuel storage modules based on temperature, pressure rating, and fuel storage volume in the one or more tanks.

27. The multi-receptacle fuel filling and storage system of clause 25, any other suitable clause, or any combination of suitable clauses, wherein the controller allows for communication between the one or more fuel storage modules, the one or more tanks, the one or more fuel receptacles, the one or more nozzles, and/or the fuel filling station.

28. The multi-receptacle fuel filling and storage system of clause 27, any other suitable clause, or any combination of suitable clauses, wherein the communication is through wired, wireless and/or power line connections and associated protocols, a standard controller area network, J1939 industry standard protocol, Ethernet, InfiniBand®, Bluetooth®, Wi-Fi®, or WiMAX.

29. The multi-receptacle fuel filling and storage system of clause 25, any other suitable clause, or any combination of suitable clauses, wherein the controller manages, detects, analyzes, compares, and/or alters the temperature and/or pressure inside each of the one or more tanks and/or the one or more fuel storage modules.

30. The multi-receptacle fuel filling and storage system of clause 25, any other suitable clause, or any combination of suitable clauses, wherein the controller is on the vehicle and/or powertrain.

31. The multi-receptacle fuel filling and storage system of clause 25, any other suitable clause, or any combination of suitable clauses, wherein the controller is outside the vehicle and/or powertrain.

32. The multi-receptacle fuel filling and storage system of clause 1, any other suitable clause, or any combination of suitable clauses, wherein the multi-receptacle fuel filling and storage system includes one or more sensors.

33. The multi-receptacle fuel filling and storage system of clause 32, any other suitable clause, or any combination of suitable clauses, wherein the one or more sensors are temperature, pressure, current, power, and/or voltage sensors.

34. The multi-receptacle fuel filling and storage system of clause 32, any other suitable clause, or any combination of suitable clauses, wherein the one or more sensors communicate to the controller and/or other components of the multi-receptacle fuel filling and storage system.

35. The multi-receptacle fuel filling and storage system of clause 1, any other suitable clause, or any combination of suitable clauses, wherein the multi-receptacle fuel filling and storage system includes the same number of fuel filling nozzles, fuel filling receptacles, and/or fuel storage modules.

36. The multi-receptacle fuel filling and storage system of clause 1, any other suitable clause, or any combination of suitable clauses, wherein the multi-receptacle fuel filling and storage system has a ratio of fuel filling nozzles, fuel filling receptacles, and fuel storage modules of 1:1:1.

37. The multi-receptacle fuel filling and storage system of clause 1, any other suitable clause, or any combination of suitable clauses, wherein the multi-receptacle fuel filling and storage system comprises about five fuel filling nozzles, about five fuel filling receptacles, about five fuel storage modules, wherein each fuel storage module comprises about three tanks, about three or more sensors, and about one internal flow path.

38. The multi-receptacle fuel filling and storage system of clause 1, any other suitable clause, or any combination of suitable clauses, wherein the multi-receptacle fuel filling and storage system comprises about five fuel filling nozzles, about five fuel filling receptacles, about five fuel storage modules, about fifteen tanks, about fifteen or more sensors, and about one or more internal flow paths.

39. The multi-receptacle fuel filling and storage system of clause 1, any other suitable clause, or any combination of suitable clauses, wherein the multi-receptacle fuel filling and storage system includes one or more feedback devices.

40. The multi-receptacle fuel filling and storage system of clause 39, any other suitable clause, or any combination of suitable clauses, wherein the one or more feedback devices include one or more sensors and/or one or more controllers.

41. The multi-receptacle fuel filling and storage system of clause 39, any other suitable clause, or any combination of suitable clauses, wherein the one or more feedback devices conduct feedback communication.

42. The multi-receptacle fuel filling and storage system of clause 41, any other suitable clause, or any combination of suitable clauses, wherein the feedback communication starts, stops, alters, monitors, and/or regulates fueling.

43. The multi-receptacle fuel filling and storage system of clause 1, any other suitable clause, or any combination of suitable clauses, wherein multi-receptacle fuel filling and storage system includes a recalibration device or mechanism.

44. The multi-receptacle fuel filling and storage system of clause 43, any other suitable clause, or any combination of suitable clauses, wherein the recalibration device or mechanism is a sensor and/or a balancing means.

45. The multi-receptacle fuel filling and storage system of clause 43, any other suitable clause, or any combination of suitable clauses, wherein the recalibration device or mechanism detects imbalance in the fuel storage of the one or more tanks of the one or more fuel storage modules.

46. The multi-receptacle fuel filling and storage system of clause 43, any other suitable clause, or any combination of suitable clauses, wherein the recalibration device or mechanism requires that fuel is moved from one tank to another tank within the one or more fuel storage modules.

47. The multi-receptacle fuel filling and storage system of clause 43, any other suitable clause, or any combination of suitable clauses, wherein the recalibration device or mechanism is automatic, electronic, and/or performed in real time.

48. The multi-receptacle fuel filling and storage system of clause 43, any other suitable clause, or any combination of suitable clauses, wherein the recalibration device or mechanism is not performed in real time and needs input from an operator, a user, or a human.

49. The multi-receptacle fuel filling and storage system of clause 1, any other suitable clause, or any combination of suitable clauses, wherein the vehicle and/or powertrain includes an unlimited number of the multi-receptacle fuel filling and storage system.

50. The multi-receptacle fuel filling and storage system of clause 1, any other suitable clause, or any combination of suitable clauses, wherein the vehicle and/or powertrain has at least one multi-receptacle fuel filling and storage system on a left side and/or at least one multi-receptacle fuel filling and storage system on a right side of the vehicle and/or powertrain.

51. The multi-receptacle fuel filling and storage system of clause 1, any other suitable clause, or any combination of suitable clauses, wherein the vehicle and/or powertrain has communication with the fuel filling station.

52. The multi-receptacle fuel filling and storage system of clause 51, any other suitable clause, or any combination of suitable clauses, wherein the communication is through wired, wireless and/or power line connections and associated protocols, a standard controller area network, J1939 industry standard protocol, Ethernet, InfiniBand®, Bluetooth®, Wi-Fi®, WiMAX, 3G, 4G LTE, or 5G.

53. The multi-receptacle fuel filling and storage system of clause 1, any other suitable clause, or any combination of suitable clauses, wherein each of the one or more fuel filling receptacles attach or connect to one of the one or more fuel filling nozzles, or more than one of the one or more nozzles.

54. The multi-receptacle fuel filling and storage system of clause 1, any other suitable clause, or any combination of suitable clauses, wherein the one or more fuel filling nozzles are attached to a fuel filling pump.

55. The multi-receptacle fuel filling and storage system of clause 1, any other suitable clause, or any combination of suitable clauses, wherein the one or more fuel filling nozzles contact, connect, and/or lock with each of the one or more fuel filling receptacles, or simultaneously or sequentially contact, connect and/or lock with each of the one or more fuel filling receptacles 56. The multi-receptacle fuel filling and storage system of clause 1, any other suitable clause, or any combination of suitable clauses, wherein the one or more fuel filling nozzles are enabled to dispense the fuel from the fuel filling pump through each nozzle and into the one or more fuel filling receptacles.

57. The multi-receptacle fuel filling and storage system of clause 1, any other suitable clause, or any combination of suitable clauses, wherein the one or more fuel filling nozzles comprise one or more levers that match or complement the one or more fuel filling receptacles.

58. The multi-receptacle fuel filling and storage system of clause 1, any other suitable clause, or any combination of suitable clauses, wherein the one or more fuel storage modules store or hold the fuel.

59. The multi-receptacle fuel filling and storage system of clause 1, any other suitable clause, or any combination of suitable clauses, wherein the one or more fuel storage modules include two, three, four, five, six or more fuel storage modules.

60. The multi-receptacle fuel filling and storage system of clause 1, any other suitable clause, or any combination of suitable clauses, wherein the each of the one or more fuel storage modules include a different number of one or more tanks.

61. The multi-receptacle fuel filling and storage system of clause 1, any other suitable clause, or any combination of suitable clauses, wherein the one or more fuel storage modules are in connection or communication with each other.

62. The multi-receptacle fuel filling and storage system of clause 1, any other suitable clause, or any combination of suitable clauses, wherein the one or more fuel storage modules are isolated from each other and are not in contact or communication with each other.

63. The multi-receptacle fuel filling and storage system of clause 1, any other suitable clause, or any combination of suitable clauses, wherein the one or more fuel storage modules are isolated, not in contact, or not in communication with each other by at least one separation device.

64. The multi-receptacle fuel filling and storage system of clause 63, any other suitable clause, or any combination of suitable clauses, wherein the at least one separation device comprises at least one isolation solenoid valve with or without electronic controls, at least one fuel supply solenoid valve with or without electronic controls, at least one refill solenoid valve with or without electronic controls, and/or other isolation devices with or without electronic controls.

65. The multi-receptacle fuel filling and storage system of clause 1, any other suitable clause, or any combination of suitable clauses, wherein each of the one or more fuel storage modules have one or more tanks, at least one tank, any number of tanks, from about 1 tank to about 15 tanks, from about 1 tank to about 12 tanks, from about 1 tank to about 10 tanks, from about 1 tank to about 6 tanks, from about 1 tank to about 5 tanks, from about 1 tank to about 4 tanks, from about 1 tank to about 3 tanks, from about 1 tank to about 2 tanks, or any specific number comprised therein.

66. The multi-receptacle fuel filling and storage system of clause 1, any other suitable clause, or any combination of suitable clauses, wherein each of the one or more fuel storage modules comprises one or more sensors.

67. The multi-receptacle fuel filling and storage system of clause 1, any other suitable clause, or any combination of suitable clauses, wherein each of the one or more fuel storage modules have one or more fuel filling receptacles.

68. The multi-receptacle fuel filling and storage system of clause 1, any other suitable clause, or any combination of suitable clauses, wherein the one or more fuel storage modules are over pressurized to a specific pressure, and/or are over pressurized to about 125% of the rated pressure, and/or are over pressurized to be compliant and in accordance with safety limits, regulations, and/or restrictions.

69. The multi-receptacle fuel filling and storage system of clause 1, any other suitable clause, or any combination of suitable clauses, wherein the one or more fuel storage modules are pressurized to the rated pressure point, and/or are pressurized to a pressure ranging from about 150 bar to about 1000 bar, or any specific pressure comprised therein.

70. The multi-receptacle fuel filling and storage system of clause 1, any other suitable clause, or any combination of suitable clauses, wherein the one or more fuel storage modules comprise hydrogen fuel and/or are pressurized at a pressure ranging from about 350 bar to about 900 bar, or any specific pressure comprised therein, or are pressurized at about 500, 550, 600, 650, 700, 750, or 800 bar.

71. The multi-receptacle fuel filling and storage system of clause 1, any other suitable clause, or any combination of suitable clauses, wherein the one or more fuel storage modules comprise natural gas and/or are pressurized to a pressure ranging from about 150 bar to about 500 bar, or any specific pressure comprised therein, or are pressurized at a pressure of or about 150, 200, 250, 300, or 350 bar.

72. The multi-receptacle fuel filling and storage system of clause 1, any other suitable clause, or any combination of suitable clauses, wherein the one or more fuel storage modules comprise cryo-liquid fuel and/or are pressurized to a pressure ranging from about 0 bar to about 50 bar, or any specific pressure comprised therein, or are pressurized at a pressure of or about 0, 5, 10, 15, 20, 25, 30, 35, 40, 45, or 50 bar.

73. The multi-receptacle fuel filling and storage system of clause 1, any other suitable clause, or any combination of suitable clauses, wherein the one or more fuel storage modules are partially filled.

74. The multi-receptacle fuel filling and storage system of clause 1, any other suitable clause, or any combination of suitable clauses, wherein the one or more fuel storage modules are partially filled as a result of a temperature of the fuel inside the one or more fuel storage modules increasing.

75. The multi-receptacle fuel filling and storage system of clause 74, any other suitable clause, or any combination of suitable clauses, wherein the temperature of the fuel decreases to a range of about 85° C. to about 25° C., or any specific temperature comprised therein, when the one or more fuel storage modules are partially filled.

76. The multi-receptacle fuel filling and storage system of clause 74, any other suitable clause, or any combination of suitable clauses, wherein the maximum temperature of the fuel in the one or more fuel storage modules ranges from about 25° C. to about 1000° C., any specific temperature comprised therein, and/or at or about 85° C.

77. The multi-receptacle fuel filling and storage system of clause 74, any other suitable clause, or any combination of suitable clauses, wherein the temperature of the fuel decreases to a range about about 25° C. to about −40° C., or any specific temperature comprised therein, in ambient or freezing conditions.

78. The multi-receptacle fuel filling and storage system of clause 74, any other suitable clause, or any combination of suitable clauses, wherein the change in temperature in the one or more fuel storage modules during and/or after filling fuel is offset or overcome by over pressuring the one or more fuel storage modules.

79. The multi-receptacle fuel filling and storage system of clause 1, any other suitable clause, or any combination of suitable clauses, wherein each of the one or more fuel storage modules comprise an internal flow path.

80. The multi-receptacle fuel filling and storage system of clause 79, any other suitable clause, or any combination of suitable clauses, wherein the internal flow path in use reduces a temperature of the one or more fuel storage modules, and/or reduces the temperature the one or more fuel storage modules by about 5° C.

81. The multi-receptacle fuel filling and storage system of clause 79, any other suitable clause, or any combination of suitable clauses, wherein the internal flow path has a fuel filter.

82. The multi-receptacle fuel filling and storage system of clause 1, any other suitable clause, or any combination of suitable clauses, wherein the one or more tanks are each separated by a pressure equalizing wall.

83. The multi-receptacle fuel filling and storage system of clause 82, any other suitable clause, or any combination of suitable clauses, wherein the pressure equalizing wall equalizes the pressure between the one or more tanks.

84. The multi-receptacle fuel filling and storage system of clause 82, any other suitable clause, or any combination of suitable clauses, wherein the pressure equalizing wall allows for fuel flow between the one or more tanks, and/or allow for fuel flow between the one or more tanks based on temperature and pressure variances in the one or more tanks.

85. The multi-receptacle fuel filling and storage system of clause 82, any other suitable clause, or any combination of suitable clauses, wherein the pressure equalizing wall is configured to be connected to and to separate each of two tanks.

86. The multi-receptacle fuel filling and storage system of clause 1, any other suitable clause, or any combination of suitable clauses, wherein the one or more tanks are cylinders.

87. The multi-receptacle fuel filling and storage system of clause 1, any other suitable clause, or any combination of suitable clauses, wherein each of the one or more tanks comprises one or more sensors.

88. A method for fueling a multi-receptacle fuel filling and storage system in a vehicle and/or powertrain comprising i) attaching one or more fuel filling nozzles to one or more fuel filling receptacles in one or more fuel storage modules, and ii) fueling the multi-receptacle fuel filling and storage system through the one or more fuel filling nozzles attached to the one or more fuel filling receptacles, wherein the one or more fuel storage modules comprise one or more tanks.

89. The method of clause 88, any other suitable clause, or any combination of suitable clauses, wherein the step of attaching the one or more fuel filling nozzles to the one or more fuel filling receptacles in the one or more fuel storage modules comprises a receptacle manifold.

90. The method of clause 89, any other suitable clause, or any combination of suitable clauses, wherein the receptacle manifold includes a first receptacle manifold and a second receptacle manifold.

91. The method of clause 90, any other suitable clause, or any combination of suitable clauses, wherein the first receptacle manifold is in any position to fuel the multi-receptacle fuel filling and storage system on a left side of the vehicle and/or powertrain.

92. The method of clause 90, any other suitable clause, or any combination of suitable clauses, wherein the second receptacle manifold is in any position to fuel the multi-receptacle fuel filling and storage system on a right side of the vehicle and/or powertrain.

93. The method of clause 90, any other suitable clause, or any combination of suitable clauses, wherein the first receptacle manifold and the second receptacle manifold are used simultaneously, sequentially, consecutively, concurrently, automatically, and/or manually by an operator or a user.

94. The method of clause 90, any other suitable clause, or any combination of suitable clauses, wherein the first receptacle manifold fuels all or a subset or a portion of the one or more fuel storage modules the left side of the vehicle and/or powertrain.

95. The method of clause 90, any other suitable clause, or any combination of suitable clauses, wherein the second receptacle manifold fuels all or a subset or a portion of the one or more fuel storage modules the right side of the vehicle and/or powertrain.

96. The method of clause 89, any other suitable clause, or any combination of suitable clauses, wherein the receptacle manifold fuels all or a subset or a portion of the one or more storage modules.

97. The method of clause 89, any other suitable clause, or any combination of suitable clauses, wherein the receptacle manifold comprises a quick connect mechanism.

98. The method of clause 97, any other suitable clause, or any combination of suitable clauses, wherein the quick connect mechanism comprises a male portion and a female portion of a plug-in socket.

99. The method of clause 98, any other suitable clause, or any combination of suitable clauses, wherein the male portion of the socket contacts and engages with the female portion of the socket.

100. The method of clause 97, any other suitable clause, or any combination of suitable clauses, wherein the quick connect mechanism is configured to simultaneously connect the one or more fuel filling nozzles to the one or more fuel filling receptacles.

101. The method of clause 89, any other suitable clause, or any combination of suitable clauses, wherein the receptacle manifold includes a multi-lever sliding arm mechanism or device.

102. The method of clause 101, any other suitable clause, or any combination of suitable clauses, wherein the multi-level sliding arm mechanism or device simultaneously connects or attaches to the one or more fuel filling receptacles.

103. The method of clause 89, any other suitable clause, or any combination of suitable clauses, wherein the receptacle manifold uses the multi-lever sliding arm mechanism or device to simultaneously detach the one or more fuel filling nozzles from the one or more fuel filling receptacles to discontinue dispensing fuel to the multi-receptacle fuel filling and storage system.

104. The method of clause 89, any other suitable clause, or any combination of suitable clauses, wherein the receptacle manifold uses a mechanism or device to attach and/or detach the one or more nozzles to the one or more fuel filling receptacles to deliver or discontinue delivery of fuel to the multi-receptacle fuel filling and storage system.

105. The method of clause 88, any other suitable clause, or any combination of suitable clauses, wherein the step of fueling the multi-receptacle fuel filling and storage system is managed by a controller.

106. The method of clause 105, any other suitable clause, or any combination of suitable clauses, wherein the controller manages the fueling of the one or more fuel storage modules based on temperature, pressure rating, and fuel storage volume in the one or more tanks.

107. The method of clause 105, any other suitable clause, or any combination of suitable clauses, wherein the controller allows for communication between the one or more fuel storage modules, the one or more tanks, the one or more fuel receptacles, the one or more nozzles, and/or the fuel filling station.

108. The method of clause 107, any other suitable clause, or any combination of suitable clauses, wherein the communication is through wired, wireless and/or power line connections and associated protocols, a standard controller area network, J1939 industry standard protocol, Ethernet, InfiniBand®, Bluetooth®, Wi-Fi®, or WiMAX.

109. The method of clause 105, any other suitable clause, or any combination of suitable clauses, wherein the controller manages, detects, analyzes, compares, and/or alters the temperature and/or pressure inside each of the one or more tanks and/or the one or more fuel storage modules.

110. The method of clause 105, any other suitable clause, or any combination of suitable clauses, wherein the controller is on the vehicle and/or powertrain.

111. The method of clause 105, any other suitable clause, or any combination of suitable clauses, wherein the controller is outside the vehicle and/or powertrain.

112. The method of clause 88, any other suitable clause, or any combination of suitable clauses, wherein the method further comprises a step of determining and/or detecting a fuel storage volume of the one or more tanks.

113. The method of clause 88, any other suitable clause, or any combination of suitable clauses, wherein the method further comprises a step of determining the rate of change of pressure for the one or more tanks based on the fuel storage volume of each of the one or more tanks and a pressure rating associated with a given fuel storage volume.

114. The method of clause 88, any other suitable clause, or any combination of suitable clauses, wherein the method further comprises a step of determining and/or detecting the total number of the one or more tanks in all of the one or more fuel storage modules.

115. The method of clause 88, any other suitable clause, or any combination of suitable clauses, wherein the method further comprises a step of isolating the one or more fuel storage modules from each other.

116. The method of clause 88, any other suitable clause, or any combination of suitable clauses, wherein the method further comprises a step of establishing communication between the one or more fuel storage modules with the controller.

117. The method of clause 88, any other suitable clause, or any combination of suitable clauses, wherein the method further comprises a step of establishing communication between the vehicle and/or powertrain and a fuel filling station.

118. The method of clause 88, any other suitable clause, or any combination of suitable clauses, wherein the method further comprises a step of managing a temperature of each of the one or more tanks with the controller and/or with recalibrating the use of the one or more fuel filling nozzles.

119. The method of clause 88, any other suitable clause, or any combination of suitable clauses, wherein the method further comprises a step of determining whether a maximum pressure has been reached in each of the one or more tanks.

120. The method of clause 88, any other suitable clause, or any combination of suitable clauses, wherein the method further comprises a step of the controller determining whether a maximum storage mass has been achieved after the maximum pressure has been reached.

121. The method of clause 88, any other suitable clause, or any combination of suitable clauses, wherein the method further comprises initiating a fueling stop protocol when the maximum storage mass has been achieved.

122. The method of clause 88, any other suitable clause, or any combination of suitable clauses, wherein the method further comprises a step of releasing the one or more fuel filling nozzles from the a fuel filling station.

123. The method of clause 122, any other suitable clause, or any combination of suitable clauses, wherein the step of releasing the one or more fuel filling nozzles comprises accessing or simultaneously accessing the one or more nozzles of a receptacle manifold.

124. The method of clause 88, any other suitable clause, or any combination of suitable clauses, wherein the method further comprises inserting or simultaneously inserting the one or more nozzles into the one or more fuel filling receptacles and dispensing or simultaneously dispensing fuel from the one or more nozzles into the one or more fuel storage modules.

125. The method of clause 88, any other suitable clause, or any combination of suitable clauses, wherein the method further comprises a step of inserting or simultaneously inserting the one or more nozzles into the one or more fuel cell receptacles and dispensing or simultaneously dispensing fuel from the one or more nozzles into the one or more tanks of the one or more fuel storage modules.

126. The method of clause 88, any other suitable clause, or any combination of suitable clauses, wherein the method further comprises a step of filling the fuel to any capacity or maximum capacity.

127. The method of clause 88, any other suitable clause, or any combination of suitable clauses, wherein the method further comprises a step of storing the fuel in the one or more tanks of the one or more fuel storage modules of the vehicle and/or powertrain.

128. The method of clause 88, any other suitable clause, or any combination of suitable clauses, wherein the method further comprises a step of reducing or preventing refueling the vehicle and/or powertrain on a trip or a route, wherein the average distance of the trip or the route ranges from about 300 miles to about 800 miles, or any mileage comprised therein.

129. The method of clause 88, any other suitable clause, or any combination of suitable clauses, wherein the method further comprises a step of preventing or reducing an operator from refueling the vehicle and/or powertrain on a trip or a route.

130. The method of clause 88, any other suitable clause, or any combination of suitable clauses, wherein the multi-receptacle fuel filling and storage system includes a fuel.

131. The method of clause 130, any other suitable clause, or any combination of suitable clauses, wherein the fuel is hydrogen, hydrocarbon fuel, natural gas, gasoline, cryo-liquid fuel, gaseous compressed hydrogen, liquid hydrogen, cryogenic compressed hydrogen, gaseous compressed natural gas, liquid natural gas, or any fuel known to power a vehicle or a powertrain.

132. The method of clause 130, any other suitable clause, or any combination of suitable clauses, wherein the fuel is filled, stored, and/or dispensed by the multi-receptacle fuel filling and storage system of the vehicle and/or powertrain, or is filled, stored, and/or dispensed by the multi-receptacle fuel filling and storage system of the vehicle and/or powertrain in a fuel filling station.

133. The method of clause 132, any other suitable clause, or any combination of suitable clauses, wherein the fuel filling station is a gas station or a fueling station.

134. The method of clause 132, any other suitable clause, or any combination of suitable clauses, wherein the fuel filling station includes a receptacle manifold.

135. The method of clause 130, any other suitable clause, or any combination of suitable clauses, wherein the fuel can be delivered to the multi-receptacle fuel filling and storage system at a rate that is faster than a rate of filling a fuel storage system that has one fuel storage module with a single fuel filling receptacle.

136. The method of clause 135, any other suitable clause, or any combination of suitable clauses, wherein the rate of filling the vehicle and/or powertrain with the multi-receptacle fuel filling and storage system is a multiple of the rate of filling the fuel storage system that has one fuel storage module with the single fuel filling receptacle.

137. The method of clause 88, any other suitable clause, or any combination of suitable clauses, wherein the multi-receptacle fuel filling and storage system is filled with fuel until a rated pressure point of the fuel storage module is reached or at maximum capacity.

138. The method of clause 88, any other suitable clause, or any combination of suitable clauses, wherein the multi-receptacle fuel filling and storage system includes one or more sensors.

139. The method of clause 138, any other suitable clause, or any combination of suitable clauses, wherein the one or more sensors are temperature, pressure, current, power, and/or voltage sensors.

140. The method of clause 138, any other suitable clause, or any combination of suitable clauses, wherein the one or more sensors communicate to the controller and/or other components of the multi-receptacle fuel filling and storage system.

141. The method of clause 88, any other suitable clause, or any combination of suitable clauses, wherein the multi-receptacle fuel filling and storage system includes the same number of fuel filling nozzles, fuel filling receptacles, and/or fuel storage modules.

142. The method of clause 88, any other suitable clause, or any combination of suitable clauses, wherein the multi-receptacle fuel filling and storage system has a ratio of fuel filling nozzles, fuel filling receptacles, and fuel storage modules of 1:1:1.

143. The method of clause 88, any other suitable clause, or any combination of suitable clauses, wherein the multi-receptacle fuel filling and storage system comprises about five fuel filling nozzles, about five fuel filling receptacles, about five fuel storage modules, wherein each fuel storage module comprises about three tanks, about three or more sensors, and about one internal flow path.

144. The method of clause 88, any other suitable clause, or any combination of suitable clauses, wherein the multi-receptacle fuel filling and storage system comprises about five fuel filling nozzles, about five fuel filling receptacles, about five fuel storage modules, about fifteen tanks, about fifteen or more sensors, and about one or more internal flow paths.

145. The method of clause 88, any other suitable clause, or any combination of suitable clauses, wherein the multi-receptacle fuel filling and storage system includes one or more feedback devices.

146. The method of clause 145, any other suitable clause, or any combination of suitable clauses, wherein the one or more feedback devices include one or more sensors and/or one or more controllers.

147. The method of clause 145, any other suitable clause, or any combination of suitable clauses, wherein the one or more feedback devices conduct feedback communication.

148. The method of clause 147, any other suitable clause, or any combination of suitable clauses, wherein the feedback communication starts, stops, alters, monitors, and/or regulates fueling.

149. The method of clause 88, any other suitable clause, or any combination of suitable clauses, wherein multi-receptacle fuel filling and storage system includes a recalibration device or mechanism.

150. The method of clause 149, any other suitable clause, or any combination of suitable clauses, wherein the recalibration device or mechanism is a sensor and/or a balancing means.

151. The method of clause 149, any other suitable clause, or any combination of suitable clauses, wherein the recalibration device or mechanism detects imbalance in the fuel storage of the one or more tanks of the one or more fuel storage modules.

152. The method of clause 149, any other suitable clause, or any combination of suitable clauses, wherein the recalibration device or mechanism requires that fuel is moved from one tank to another tank within the one or more fuel storage modules.

153. The method of clause 149, any other suitable clause, or any combination of suitable clauses, wherein the recalibration device or mechanism is automatic, electronic, and/or performed in real time.

154. The method of clause 149, any other suitable clause, or any combination of suitable clauses, wherein the recalibration device or mechanism is not performed in real time and needs input from an operator, a user, or a human.

155. The method of clause 88, any other suitable clause, or any combination of suitable clauses, wherein the vehicle and/or powertrain includes an unlimited number of the multi-receptacle fuel filling and storage system.

156. The method of clause 88, any other suitable clause, or any combination of suitable clauses, wherein the vehicle and/or powertrain has at least one multi-receptacle fuel filling and storage system on a left side and/or at least one multi-receptacle fuel filling and storage system on a right side of the vehicle and/or powertrain.

157. The method of clause 88, any other suitable clause, or any combination of suitable clauses, wherein the vehicle and/or powertrain has communication with the fuel filling station.

158. The method of clause 157, any other suitable clause, or any combination of suitable clauses, wherein the communication is through wired, wireless and/or power line connections and associated protocols, a standard controller area network, J1939 industry standard protocol, Ethernet, InfiniBand®, Bluetooth®, WiMAX, 3G, 4G LTE, or 5G.

159. The method of clause 88, any other suitable clause, or any combination of suitable clauses, wherein the one or more fuel filling nozzles are attached to a fuel filling pump.

160. The method of clause 88, any other suitable clause, or any combination of suitable clauses, wherein the one or more fuel filling nozzles contact, connect, and/or lock with each of the one or more fuel filling receptacles, or simultaneously or sequentially contact, connect and/or lock with each of the one or more fuel filling receptacles 161. The method of clause 88, any other suitable clause, or any combination of suitable clauses, wherein the one or more fuel filling nozzles are enabled to dispense the fuel from the fuel filling pump through each nozzle and into the one or more fuel filling receptacles.

162. The method of clause 88, any other suitable clause, or any combination of suitable clauses, wherein the one or more fuel filling nozzles comprise one or more levers that match or complement the one or more fuel filling receptacles.

163. The method of clause 88, any other suitable clause, or any combination of suitable clauses, wherein each of the one or more fuel filling receptacles attach or connect to one of the one or more fuel filling nozzles, or more than one of the one or more nozzles.

164. The method of clause 88, any other suitable clause, or any combination of suitable clauses, wherein the one or more fuel storage modules store or hold the fuel.

165. The method of clause 88, any other suitable clause, or any combination of suitable clauses, wherein the one or more fuel storage modules include two, three, four, five, six or more fuel storage modules.

166. The method of clause 88, any other suitable clause, or any combination of suitable clauses, wherein the each of the one or more fuel storage modules include a different number of one or more tanks.

167. The method of clause 88, any other suitable clause, or any combination of suitable clauses, wherein the one or more fuel storage modules are in connection or communication with each other.

168. The method of clause 88, any other suitable clause, or any combination of suitable clauses, wherein the one or more fuel storage modules are isolated from each other and are not in contact or communication with each other.

169. The method of clause 88, any other suitable clause, or any combination of suitable clauses, wherein the one or more fuel storage modules are isolated, not in contact, or not in communication with each other by at least one separation device.

170. The method of clause 169, any other suitable clause, or any combination of suitable clauses, wherein the at least one separation device comprises at least one isolation solenoid valve with or without electronic controls, at least one fuel supply solenoid valve with or without electronic controls, at least one refill solenoid valve with or without electronic controls, and/or other isolation devices with or without electronic controls.

171. The method of clause 88, any other suitable clause, or any combination of suitable clauses, wherein each of the one or more fuel storage modules have one or more tanks, at least one tank, any number of tanks, from about 1 tank to about 15 tanks, from about 1 tank to about 12 tanks, from about 1 tank to about 10 tanks, from about 1 tank to about 6 tanks, from about 1 tank to about 5 tanks, from about 1 tank to about 4 tanks, from about 1 tank to about 3 tanks, or from about 1 tank to about 2 tanks, or any specific number comprised therein.

172. The method of clause 88, any other suitable clause, or any combination of suitable clauses, wherein each of the one or more fuel storage modules comprises one or more sensors.

173. The method of clause 88, any other suitable clause, or any combination of suitable clauses, wherein each of the one or more fuel storage modules have one or more fuel filling receptacles.

174. The method of clause 88, any other suitable clause, or any combination of suitable clauses, wherein the one or more fuel storage modules are over pressurized to a specific pressure, and/or are over pressurized to about 125% of the rated pressure, and/or are over pressurized to be compliant and in accordance with safety limits, regulations, and/or restrictions.

175. The method of clause 88, any other suitable clause, or any combination of suitable clauses, wherein the one or more fuel storage modules are pressurized to the rated pressure point, and/or are pressurized to a pressure ranging from about 150 bar to about 1000 bar, or any specific pressure comprised therein.

176. The method of clause 88, any other suitable clause, or any combination of suitable clauses, wherein the one or more fuel storage modules comprise hydrogen fuel and/or are pressurized at a pressure ranging from about 350 bar to about 900 bar, or any specific pressure comprised therein, or are pressurized at about 500, 550, 600, 650, 700, 750, or 800 bar.

177. The method of clause 88, any other suitable clause, or any combination of suitable clauses, wherein the one or more fuel storage modules comprise natural gas and/or are pressurized to a pressure ranging from about 150 bar to about 500 bar, or any specific pressure comprised therein, or are pressurized at a pressure of or about 150, 200, 250, 300, or 350 bar.

178. The method of clause 88, any other suitable clause, or any combination of suitable clauses, wherein the one or more fuel storage modules comprise cryo-liquid fuel and/or are pressurized to a pressure ranging from about 0 bar to about 50 bar, or any specific pressure comprised therein, or are pressurized at a pressure of or about 0, 5, 10, 15, 20, 25, 30, 35, 40, 45, or 50 bar.

179. The method of clause 88, any other suitable clause, or any combination of suitable clauses, wherein the one or more fuel storage modules are partially filled.

180. The method of clause 88, any other suitable clause, or any combination of suitable clauses, wherein the one or more fuel storage modules are partially filled as a result of a temperature of the fuel inside the one or more fuel storage modules increasing.

181. The method of clause 180, any other suitable clause, or any combination of suitable clauses, wherein the temperature of the fuel decreases to a range of about 85° C. to about 25° C., or any specific temperature comprised therein, when the one or more fuel storage modules are partially filled.

182. The method of clause 180, any other suitable clause, or any combination of suitable clauses, wherein the maximum temperature of the fuel in the one or more fuel storage modules ranges from about 25° C. to about 1000° C., any specific temperature comprised therein, and/or at or about 85° C.

183. The method of clause 180, any other suitable clause, or any combination of suitable clauses, wherein the temperature of the fuel decreases to a range about about 25° C. to about −40° C., or any specific temperature comprised therein, in ambient or freezing conditions.

184. The method of clause 180, any other suitable clause, or any combination of suitable clauses, wherein the change in temperature in the one or more fuel storage modules during and/or after filling fuel is offset or overcome by over pressuring the one or more fuel storage modules.

185. The method of clause 88, any other suitable clause, or any combination of suitable clauses, wherein each of the one or more fuel storage modules comprise an internal flow path.

186. The method of clause 185, any other suitable clause, or any combination of suitable clauses, wherein the internal flow path in use reduces a temperature of the one or more fuel storage modules, and/or reduces the temperature the one or more fuel storage modules by about 5° C.

187. The method of clause 185, any other suitable clause, or any combination of suitable clauses, wherein the internal flow path has a fuel filter.

188. The method of clause 88, any other suitable clause, or any combination of suitable clauses, wherein the one or more tanks are each separated by a pressure equalizing wall.

189. The method of clause 188, any other suitable clause, or any combination of suitable clauses, wherein the pressure equalizing wall equalizes the pressure between the one or more tanks.

190. The method of clause 188, any other suitable clause, or any combination of suitable clauses, wherein the pressure equalizing wall allows for fuel flow between the one or more tanks, and/or allow for fuel flow between the one or more tanks based on temperature and pressure variances in the one or more tanks.

191. The method of clause 188, any other suitable clause, or any combination of suitable clauses, wherein the pressure equalizing wall is configured to be connected to and to separate each of two tanks.

192. The method of clause 88, any other suitable clause, or any combination of suitable clauses, wherein the one or more tanks are cylinders.

193. The method of clause 88, any other suitable clause, or any combination of suitable clauses, wherein each of the one or more tanks comprises one or more sensors.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A multi-receptacle fuel filling and storage system in a vehicle and/or powertrain comprising,
   fuel filling receptacles for simultaneously attaching to fuel filling nozzles,
   one or more fuel storage modules, each of the fuel storage modules configured to be attached to one of the fuel filling receptacles,
   more than one tank comprised in each of the one or more fuel storage modules,
   a sensor located in each of the tanks, and
   a controller configured to manage the fueling of the one or more fuel storage modules based on a pressure rating and a fuel storage volume of the tanks, wherein the pressure rating is determined by the sensor located in each of the tanks based on the fuel storage volume of each of the tanks.

2. The multi-receptacle fuel filling and storage system of claim 1, wherein the tanks are separated by a pressure equalizing wall configured to allow flow of fuel between the tanks in the fuel storage module.

3. The multi-receptacle fuel filling and storage system of claim 1, wherein the controller further manages the fueling of the one or more fuel storage modules based on temperature in the tanks.

4. The multi-receptacle fuel filling and storage system of claim 1, wherein the system further comprises a temperature sensor.

5. The multi-receptacle fuel filling and storage system of claim 1, wherein the system includes the same number of fuel filling nozzles, fuel filling receptacles, and fuel storage modules.

6. The multi-receptacle fuel filling and storage system of claim 1, wherein the fuel filling nozzles are attached to a fuel filling pump.

7. The multi-receptacle fuel filling and storage system of claim 1, wherein the fuel filling nozzles comprise one or more levers that complement the fuel filling receptacles.

8. The multi-receptacle fuel filling and storage system of claim 1, wherein each of the one or more fuel storage modules include an internal flow path.

9. The multi-receptacle fuel filling and storage system of claim 8, wherein each internal flow path has a fuel filter.

10. A method for fueling a multi-receptacle fuel filling and storage system in a vehicle and/or powertrain comprising,
    attaching fuel filling nozzles to fuel filling receptacles in one or more fuel storage modules,
    fueling the multi-receptacle fuel filling and storage system through the fuel filling nozzles attached to the fuel filling receptacles, wherein each of the one or more fuel storage modules include more than one tank, and
    managing the fueling of the one or more fuel storage modules based on a pressure rating and a fuel storage volume of the tanks, wherein the pressure rating is determined by a sensor located in each of the tanks based on the fuel storage volume of each of the tanks.

11. The method of claim 10, wherein attaching the fuel filling nozzles to the fuel filling receptacles in the one or more fuel storage modules comprises a receptacle manifold.

12. The method of claim 10, wherein fueling the multi-receptacle fuel filling and storage system is managed by a controller.

13. The method of claim 12, wherein managing the fueling of the one or more fuel storage modules by the controller is based on temperature in the tanks.

14. The method of claim 10, wherein managing fueling of the one or more fuel storage modules comprises the tanks being separated by a pressure equalizing wall.

15. The method of claim 10, wherein fueling the multi-receptacle fuel filling and storage system comprises fuel filling nozzles being attached to a fuel filling pump.

16. The method of claim 10, wherein fueling the multi-receptacle fuel filling and storage system further comprises a temperature sensor.

17. The method of claim 10, wherein fueling the multi-receptacle fuel filling and storage system with the fuel filling nozzles comprises one or more levers that complement the fuel filling receptacles.

18. The method of claim 10, wherein attaching the fuel filling nozzles to each of the one or more fuel storage modules includes an internal flow path.

19. The method of claim 18, wherein each internal flow path has a fuel filter.

20. The method of claim 10, further comprising stopping refueling when a maximum pressure is reached in the tanks.

\* \* \* \* \*